United States Patent
Smith et al.

(10) Patent No.: US 11,403,685 B2
(45) Date of Patent: Aug. 2, 2022

(54) AUTOMATIC DISTRIBUTION OF LICENSES FOR A THIRD-PARTY SERVICE OPERATING IN ASSOCIATION WITH A LICENSED FIRST-PARTY SERVICE

(71) Applicant: BlackBerry Limited, Waterloo (CA)

(72) Inventors: Andrew Christopher Smith, Ancaster (CA); Richard Eric Nicolaisen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1171 days.

(21) Appl. No.: 15/295,132

(22) Filed: Oct. 17, 2016

(65) Prior Publication Data

US 2018/0108059 A1 Apr. 19, 2018

(51) Int. Cl.
| | | |
|---|---|---|
| *G06Q 30/00* | (2012.01) | |
| *G06Q 30/06* | (2012.01) | |
| *G06Q 20/38* | (2012.01) | |
| *G06Q 20/12* | (2012.01) | |
| *G06Q 50/18* | (2012.01) | |

(52) U.S. Cl.
CPC ..... *G06Q 30/0613* (2013.01); *G06Q 20/1235* (2013.01); *G06Q 20/3829* (2013.01); *G06Q 50/18* (2013.01)

(58) Field of Classification Search
CPC ........... G06Q 30/0613; G06Q 20/1235; G06Q 20/3829; G06Q 50/18; G06Q 30/00
USPC ....................................................... 705/26.41
See application file for complete search history.

(56) References Cited

U.S. PATENT DOCUMENTS

| | | | | |
|---|---|---|---|---|
| 4,924,378 | A * | 5/1990 | Hershey ................. | G06F 21/105 707/999.01 |
| 5,724,425 | A * | 3/1998 | Chang .................... | G06F 21/125 705/52 |
| 6,189,146 | B1 * | 2/2001 | Misra ..................... | G06F 21/105 705/59 |
| 6,728,896 | B1 * | 4/2004 | Forbes .................. | G06F 11/203 714/11 |
| 8,719,910 | B2 * | 5/2014 | Hao ........................ | H04L 63/10 726/7 |
| 9,129,096 | B2 * | 9/2015 | Schroder ................ | G06F 21/602 |
| 2002/0128842 | A1 * | 9/2002 | Hoi ......................... | G06Q 30/02 704/260 |
| 2002/0138441 | A1 * | 9/2002 | Lopatic .................. | G06F 21/125 705/59 |
| 2004/0015730 | A1 * | 1/2004 | Arai ...................... | H04N 7/1675 726/29 |
| 2004/0220926 | A1 * | 11/2004 | Lamkin ................. | H04L 67/303 |

(Continued)

OTHER PUBLICATIONS

Zhang, Zhiyong, "A novel approach to rights sharing-enabling digital rights management for mobile multimedia", link.springer.com, dated Jun. 6, 2014. (Year: 2014).*

*Primary Examiner* — Mark A Fadok

(74) *Attorney, Agent, or Firm* — Moffat & Co

(57) ABSTRACT

A first-party vendor provides a licensed first-party service on one or more electronic devices, the first-party service associated with a licensed third-party service provided by a third-party vendor on the electronic devices. When a customer purchases a first-party license for the first-party service, the customer may automatically be issued a third-party license that aligns with the first-party license. Furthermore, distribution and activation of the third-party license may be concealed from the customer.

16 Claims, 4 Drawing Sheets

(56) References Cited

U.S. PATENT DOCUMENTS

| | | | |
|---|---|---|---|
| 2005/0210254 A1* | 9/2005 | Gabryjelski | G06F 21/105 |
| | | | 713/175 |
| 2007/0198427 A1* | 8/2007 | Vajjiravel | G06Q 30/06 |
| | | | 705/59 |
| 2007/0219919 A1* | 9/2007 | Dandekar | G06Q 30/06 |
| | | | 705/59 |
| 2010/0293536 A1* | 11/2010 | Nikitin | G06F 21/10 |
| | | | 717/168 |
| 2012/0072995 A1* | 3/2012 | Crawford | G07C 9/22 |
| | | | 726/26 |
| 2012/0079577 A1* | 3/2012 | Hao | H04N 21/64322 |
| | | | 726/7 |
| 2012/0131684 A1* | 5/2012 | Lynch | H04N 21/6334 |
| | | | 726/29 |
| 2012/0216296 A1* | 8/2012 | Kidron | G06F 16/639 |
| | | | 726/28 |
| 2012/0311724 A1* | 12/2012 | Mahan | G06F 21/629 |
| | | | 726/29 |
| 2014/0223099 A1* | 8/2014 | Kidron | G06F 12/0806 |
| | | | 711/118 |
| 2015/0143539 A1* | 5/2015 | Feng | G06Q 30/00 |
| | | | 726/28 |
| 2016/0125172 A1* | 5/2016 | Fuller | G06F 16/285 |
| | | | 726/26 |

\* cited by examiner

AUTOMATIC DISTRIBUTION OF LICENSES FOR A THIRD-PARTY SERVICE OPERATING IN ASSOCIATION WITH A LICENSED FIRST-PARTY SERVICE

BACKGROUND

A vendor may offer a service, such as an application, a function, or the like, to one or more customers, where the service may be accessible via one or more electronic devices associated with each customer, provided the customer has been issued a license for access to the service. Where the service is offered directly by the vendor, the vendor may be referred to as a first-party vendor, the service may be referred to as a first-party service, and the license may be referred to as a first-party license.

In some cases, the first-party service offered by the first-party vendor may be associated with another service provided by another vendor. For example, a first-party service offered by a first-party vendor may leverage, rely on, employ, operate in conjunction with or be associated in some other way with a third-party service provided by a third-party vendor. Access to the third-party service may require a third-party license issued by the third-party vendor. In some examples, in order for the first-party vendor to allow a customer to access the first-party service (in association with the third-party service), the first-party vendor may be required to pay royalties to the third-party vendor.

DETAILED DESCRIPTION

Figure 1:
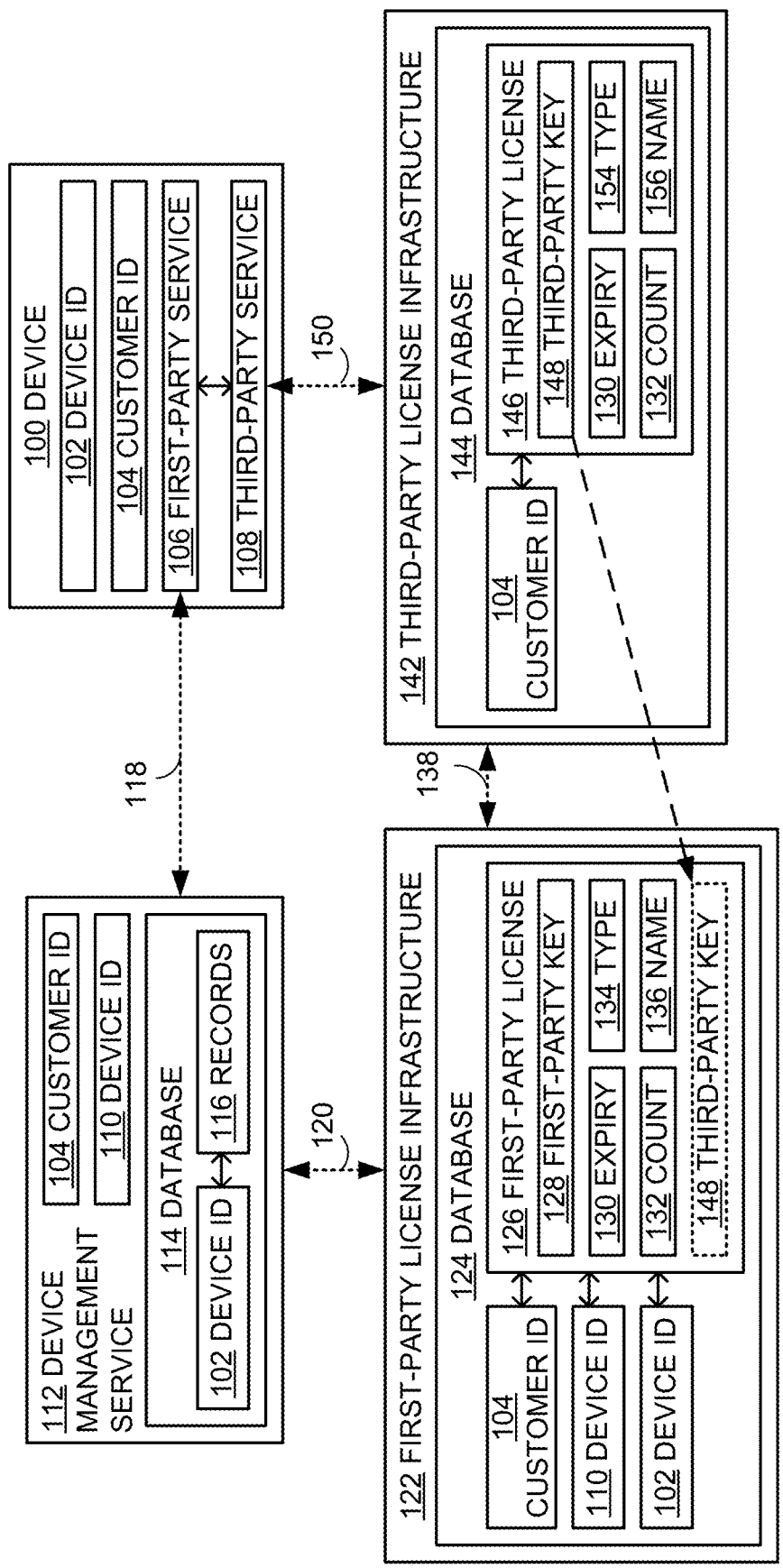
FIG. 1 illustrates a schematic diagram showing a customer device accessing a licensed first-party service that is associated with a licensed third-party service, where the first-party service is provided by a first-party vendor and the third-party service is provided by a third-party vendor, in accordance with an example of the proposed technology.

A vendor may offer a service to one or more customers. Examples of services include software applications, such as Microsoft® Windows, Microsoft® Word, BlackBerry® Enterprise Service (BES), anti-virus applications such as Norton® 360, modeling applications, and the like. The service may be accessible via one or more electronic devices associated with each customer, hereinafter referred to as customer devices. The service may comprise local software installed on a customer device to provide a service to that device. Alternatively, or additionally, the service may comprise software installed at a customer site, a remote service provided on the Internet, or some other form. Examples of customer devices include desktop computers, laptops, mobile electronic devices, tablets, and the like. Access to the service at a given customer device may require that the associated customer has been issued a license for the service.

A license may comprise various attributes, including, for example, a license key, an expiry date, a type, a count, and a name. A license key may also be referred to as a token, a product key, an activation key, or an activation code. The license key may be considered as a pointer to the license itself, and may comprise, for example, an alphanumeric code. In exchange for being issued a license to access the service, a customer may be required to make a payment to the vendor and/or to agree to one or more terms specified in an End User License Agreement (EULA), which may provide a legal framework for licensed use of the service.

Typically, a license infrastructure of the vendor may maintain a database comprising issued licenses and customer identifiers (IDs) identifying the customers to which the licenses have been issued. The database may also store device IDs identifying the customer devices that are accessing the service. Examples of device IDs may include identifiers that are derived from the device hardware or more broadly associated with the device, such as an International Mobile Equipment Identity (IMEI), a Media Access Control (MAC) address, a Globally Unique Identifier (GUID), a Personal Identification Number (PIN), or an identifier of a subscriber identity module (SIM) of the device, including, for example, an International Mobile Subscriber Identity (IMSI), an integrated circuit card identifier (ICCID), and the like.

In some examples, a plurality of customer devices may be managed by a device management service. The device management service may communicate with the license infrastructure on behalf of the customer devices and may handle how licenses are used by the customer devices. The customer devices and the associated device management service are associated with the same customer ID, whereas each customer device managed by the device management service is associated with a different device ID. In addition, the device management service itself is associated with an identifier. Thus, the term "device ID" may be used herein to refer to an identifier of a customer device (that may be managed by a device management service), and/or to an identifier of a device management service (that may manage one or more customer devices). In other examples, each customer device may communicate directly with the license infrastructure, without the involvement of a device management service.

When a customer purchases a license, a customer ID associated with the customer may be stored in the database of the license infrastructure in association with the purchased license. A single customer ID may be associated with a plurality of different licenses.

In order for a particular customer device to access the licensed service, the customer may be required to provide to the license infrastructure a device ID and either the license key pointing to the requested license, or one or more credentials associated with the customer ID. In the case where license activation is handled by a device management service, the device ID may be associated with the device management service. Upon validation of the license key or the credentials, and upon determining that the license should be activated for the particular customer device, the license infrastructure may then associate the device ID with the customer ID and with the license issued to that customer.

In some examples, the licensed service offered by the vendor may be associated with another licensed service offered by another vendor. For example, a first-party service provided by a first-party vendor may leverage, rely on, employ, operate in conjunction with or be associated in some other way with a third-party service provided by a third-party vendor. In order for a customer device to access the first-party service, which is associated with the third-party service, it may be necessary for the customer device to possess a first-party license as well as a third-party license.

Traditional methods for distributing third-party licenses may cumbersome. In one example, upon purchasing a third-party license, a customer may be sent an e-mail containing a third-party license key which the customer must manually enter into a user interface associated with a third-party service at the customer's device, so that the third-party license key can be validated by a license infrastructure of the third-party vendor. In another example, the third-party license key may be entered into an administrative console of a device management service, such that it is subsequently distributed to the customer device.

Furthermore, the requirement for both a first-party license and a third-party license to access a single service may lead to problems if the attributes of the first-party license and the third-party license (such as the expiry date, the count, the type, etc.) do not align or are incompatible. For example, in the event that a customer device is issued a third-party license that expires before its first-party license, access to the first-party service may be interrupted at the customer device. In another example, the first-party vendor may pay royalties to the third-party vendor based on the issuance of a third-party license having a particular count. However, in the event that the particular count of the third-party license is greater than the count of the first-party license issued by the first-party vendor, then not all instances of the third-party licenses will be usable, in which case the first-party vendor may be overpaying to some extent. In yet another example, in the event that the type of the third-party license differs from the type of the first-party license, the extent of access to the first-party service may be unclear, and, depending on how the royalties are charged by the third-party vendor, the first-party vendor may be overpaying or underpaying to some extent.

These and other problems may be addressed by the technology proposed herein.

FIG. 1 illustrates a schematic diagram of an example scenario in accordance with the proposed technology, in which a customer device 100 is seeking to access a first-party service 106 provided by a first-party vendor, where the first-party service 106 leverages, relies on, employs, operates in conjunction with or is associated in some other way with a third-party service 108 provided by a third-party vendor. In order for the customer device 100 to access the first-party service 106, which is associated with the third-party service 108, it may be necessary for the customer device 100 to be allocated both a first-party license and a third-party license.

In the example of FIG. 1, the first-party service 106 and the third-party service 108 are illustrated as software installed at the customer device 100. However, the first-party service 106 and the third-party service 108 may comprise alternative and/or additional forms, such as software installed at a customer site, a remote service provided on the Internet, or some other form.

The customer device 100 is associated with a device ID 102 and with a customer ID 104. Allocation of first-party licenses to customer devices, such as the customer device 100, is managed by a device management service 112, which may be installed, for example, at a customer site. The customer device 100 may, in some examples, be in possession of the customer ID 104. The device management service 112 is associated with a device ID 110. The first-party service 106 on the customer device 100 is in communication with the device management service 112, as shown by arrow 118.

For clarity, FIG. 1 illustrates a single customer device 100 being managed by the device management service 112. However, the device management service 112 may manage multiple customer devices, each one being associated with the same customer ID 104, and being associated with a different device ID. Each customer device managed by the device management service 112 may seek to access the first-party service 106, associated with the third-party service 108, in accordance with the proposed technology.

The device management service 112 is in communication with a first-party license infrastructure 122 of the first-party vendor, as shown by arrow 120. The device management service 112 may comprise a database 114 which stores records regarding the respective use of the first-party service 106 at each of the customer devices managed by the device management service 112. For example, the device ID 102 may be stored in association with records 116 indicative of particular features of the first-party service 106 being used at the device 100.

In an alternative example (not shown), the first-party service 106 may communicate directly with the first-party license infrastructure 122, without the involvement of a device management service.

In order to enable access to the first-party service 106 at the customer device 100, the customer identified by the customer ID 104 may purchase a first-party license from the first-party vendor. For example, the customer may purchase a first-party license having a specific type, a specific name, a specific count, and a specific expiry date, based on the customer's needs. In the example of FIG. 1, the customer identified by the customer ID 104 purchases a first-party license 126 having attributes including an expiry date 130, a count 132, a type 134 and a name 136. In this example, the first-party license 126 is associated with a first-party license key 128, which may comprise, for example, an alphanumeric code, such as NUS4T-GKF2R-17SCB-4CKPN. Examples of expiry dates, such as the expiry date 130, include Dec. 25, 2015, Jan. 28, 2016, and the like. Examples of counts, such as the count 132, include 10, 50, 100, and the like. Examples of names, such as the name 136, include "gold", "platinum", and the like. Examples of types, such as the type 134, include "subscription", "perpetual", "site", "Early Partner Release (EPR)", "trial", "activation", and the like. A subscription-type license may have an expiry date, whereas a perpetual type license may not. A trial-type license may be similar to a subscription-type license, but may be short in duration. An EPR-type license may be for a select group of customers that are to evaluate beta software, for example. A site-type license may allow a customer to use as much of a service as they want for a flat fee. An activation-type license may be associated with a special key that is used only temporarily at the time of initial activation of a customer device, and may be replaced at a later time. Although not explicitly illustrated, the type 134 may comprise a sub-type that further specifies characteristics of the license.

The first-party license 126 may be stored in a database 124 of the first-party license infrastructure 122. Upon issuance of the first-party license 126 to the customer associated with the customer ID 104, the customer ID 104 may be stored in the database 124 in association with the first-party license 126.

For clarity, FIG. 1 illustrates a single first-party license 126 stored in the database 124. However, the database 124 may store multiple first-party licenses, each one being associated with a unique first-party license key, and having various attributes, such as those described with respect to the first-party license 126. As previously noted, a single customer ID may be associated with a plurality of different licenses.

In accordance with the technology proposed herein, when a customer purchases a first-party license for a first-party service that is associated with a licensed third-party service, the customer may automatically be issued a third-party license having terms corresponding to those of the first-party license. Furthermore, distribution and activation of the third-party license may be concealed from the customer.

Returning to FIG. 1, the first-party license infrastructure 122 may be enabled for communication with a third-party license infrastructure 142 of the third-party vendor that provides the third-party service 108, as shown by arrow 138. The third-party license infrastructure 142 maintains a database 144 in which it stores third-party licenses to be issued to customer devices.

According to one example of the proposed technology, when the customer associated with the customer ID 104 purchases the first-party license 126 for the first-party service 106, the first-party license infrastructure 122 may send to the third-party license infrastructure 142 a request to issue to the customer a corresponding third-party license for the third-party service 108. In one example, the third-party vendor may provide an API through which the first-party license infrastructure 122 is able to communicate such a request to the third-party license infrastructure 142.

A third-party license may be considered to correspond to (or align with) a first-party license, for example, if it has the same count and the same expiry date, and if its other attributes are compatible. Thus, when the first-party license infrastructure 122 sends to the third-party license infrastructure 142 a request for issuance of a third-party license corresponding to the first-party license 126, the request should include indications of the expiry date 130 and the count 132 of the first-party license 126. The request may also include indications of the type 134 and/or the name 136. Alternatively, the request may include indications of a type 154 and/or a name 156, where the type 154 and the name 156 are compatible with the type 134 and the name 136, respectively. Compatibility between types and names may be determined, for example, from a mapping stored in the database 124. For example, such a mapping may indicate that a "gold" first-party license is compatible with a "platinum" third-party license. Thus, when the name 136 of the first-party license 126 is "gold", the first-party license infrastructure 122 may determine from the mapping that it should request a third-party license with the name 156 of "platinum". The request sent by the first-party license infrastructure 122 to the third-party license infrastructure 142 should also include an indication of the customer ID 104 for which the third-party license is to be issued.

Upon receipt of the request, the third-party license infrastructure 142 may issue a third-party license having terms that are compatible to those that were indicated in the request. In this example, the third-party license infrastructure 142 issues a third-party license 146 having the expiry date 130, the count 132, the type 154 and the name 156. The customer ID 104 is stored in the database 144 in association with the third-party license 146, thereby denoting the issuance of that particular license to that customer.

The third-party license 146 has an associated third-party license key 148, which may be, for example, an alphanumeric code. The third-party license infrastructure 142 may respond to the request from the first-party license infrastructure 122 by returning the third-party license key 148. Upon receipt of the third-party license key 148, it may be embedded in the first-party license 126. That is, the first-party license infrastructure 122 may store the third-party license key 148 as an attribute of the corresponding first-party license 126.

By embedding the third-party license key 148 within the first-party license 126, the third-party license key 148 can be automatically distributed to customer devices that have been allocated use of the first-party license 126. The first-party service 106 may provide the third-party license key 148 to the third-party service 108, which may then send the third-party license key 148 to the third-party license infrastructure for validation, as denoted by arrow 150. The acquisition and activation of the third-party license key may be concealed from the customer, thereby providing a less cumbersome experience, relative to traditional methods, for accessing the first-party service 106 (and the associated third-party service 108).

The manner in which first-party licenses (and consequently any corresponding third-party licenses) are distributed to customer devices may be determined from the outcome of a most recent license reconciliation. License reconciliation is a process whereby licenses that have been issued to a customer for access to a service at one or more of the customer's devices are reconciled with the actual use of the service at the customer devices. License reconciliation may take place locally, for example, at a device management service installed at a customer site or, in the absence of a device management service, at the customer devices themselves. Alternatively, license reconciliation may take place within the license infrastructure of the first-party vendor that is offering the first-party service. License reconciliation may be performed periodically, for example, once every 24 hours. Alternatively, or additionally, license reconciliation may be performed in response to one or more triggers, such as license purchases, changes in terms of licenses, use of service features as reported by customer devices, and the like. For example, in the case that license reconciliation is performed by the device management service, reconciliation could happen in response to a feature request.

In one example, where license reconciliation takes place within the device management service 112, the device management service 112 may periodically synchronize to the database 114 information about first-party licenses from the database 124 of the first-party license infrastructure 122, including the first-party license 126 that is associated with the customer ID 104. In order to obtain the first-party license 126, the customer may be required to provide to the first-party license infrastructure 122 information including the first-party license key 128 and/or one or more credentials associated with the customer ID 104 or credentials associated with the device management service 112. In some examples, the customer may be required to use credentials associated with the customer ID 104 in order to obtain credentials for the device management service 112. The first-party license key 128 and/or the credentials may be provided, for example, via an administrative console of the device management service 112, and sent to the first-party license infrastructure 122 for validation. The credentials may comprise, for example, the customer ID 104 itself, or a username and password associated with the customer ID 104, or some other credentials associated with the customer identified by the customer ID 104. The device ID 110 associated with the device management service 112 may also be sent to the first-party license infrastructure 122. Upon validation of the first-party license key 128 (or the credentials), the first-party license infrastructure 122 may store the device ID 110 in the database 124, in association with the first-party license 126, and the first-party license 126 may be made available to the device management service 112 for distribution to the customer device 100. Thus, if a particular customer device, such as the customer device 100, requests access to the first-party service 106, the device management service 112 may proceed by comparing the first-party license 126 received from the first-party license infrastructure 122 to the current records (including records 116) showing current use of the first-party service 106 by the customer devices managed by the device management service 112, in order to determine license consumption and availability. Based on the outcome of this comparison, the device management service 112 may determine whether or not the request from the customer device 100 for access to the first-party service 106 should be granted or denied.

Thus, the process of reconciliation in this case is performed when the feature request arrives from the customer device, and involves reconciling feature use records against available licenses to determine if a license is available. Alternatively, reconciliation may be performed separately from the feature request and perhaps the results persisted in the database.

For example, if the most recent license reconciliation at the device management service 112 shows that a first-party license is still available for the type of access being requested by the customer device 100, then the device management service 112 may provide the requested access to the customer device 100. Although not explicitly shown, in some examples the first-party license infrastructure 122 may periodically receive reports from the device management service 112 that include devices IDs, such as the device ID 102, and the specific first-party licenses and/or features or services currently associated with those IDs.

In another example, where license reconciliation takes places within the first-party license infrastructure 122, the customer may be required to provide one or more credentials associated with the customer ID 104, for validation by the first-party license infrastructure 122. The credentials may be provided, for example, via an administrative console of the device management service 112. License reconciliation may involve the device management service 112 periodically sending reports to the first-party license infrastructure 122 that include the records 116. Alternatively, the device management service 112 may send information about features in use at the time that use of the first-party service 106 is granted, instead of sending information based on database records. The device management service 112 may also send to the first-party license infrastructure 122 the device ID 102 associated with the records 116. The first-party license infrastructure 122 may periodically compare the received records 116 to the first-party license 126 to determine license consumption and availability. The first-party license infrastructure 122 may provide the outcome of the comparison to the device management service 112, for example, by exposing an application programming interface (API) to the device management service 112 (not shown).

In accordance with the proposed technology, a customer device that has been allocated an instance of a first-party license for access to a first-party service may automatically be provided with the third-party license key needed to access to the associated third-party service at that customer device.

For example, one may consider a scenario in which the first-party license 126 purchased by the customer having the customer ID 104 has the count 132 of 1000. In accordance with the proposed technology, the first-party license 126 has embedded therein a third-party license key 148 that points to a third-party license 146 with the same count 132 of 1000. Upon performing a first-party license reconciliation, the device management service 112 may determine that there are currently 600 customer devices accessing the first-party service 106 using the first-party license 126. Upon receiving a request from a new customer device to access the first-party service 106, the device management service 112 may determine that access should be granted because there are still 400 unused instances of the first-party license 126 available. Furthermore, because the device management service 112 is aware that the first-party service 106 is associated with the third-party service 108, the device management service 112 automatically makes the third-party license key 148 available to the new customer device, via the first-party service 106, such that that the third-party service 108 is able to send the third-party license key 148 to the third-party license infrastructure 142 for validation. Similarly to the first-party license 126, there are also 400 unused instances of the third-party license 146 with which the third-party license key 148 is associated. The coupling between the first-party license 126 and the third-party license 146 may prevent the synchronization problems associated with traditional methods of distributing multiple licenses for access to associated services.

Figure 2:
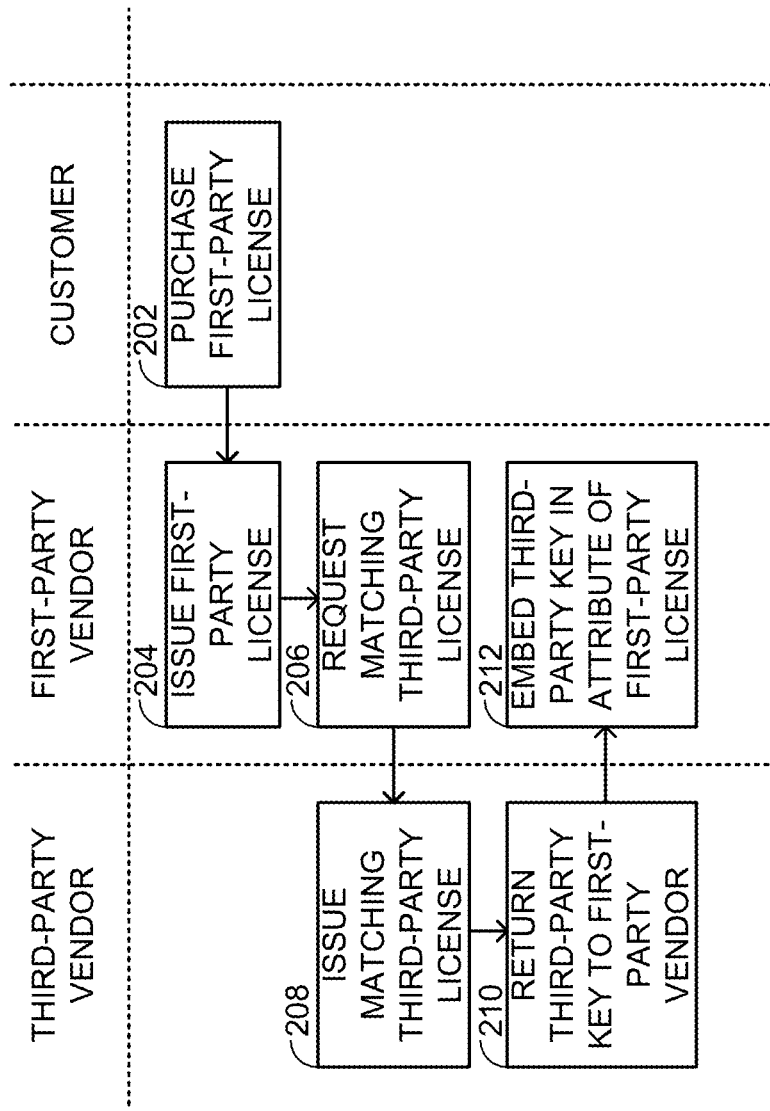
FIGS. 2 and 3 illustrate methods associated with distribution of a third-party license key, in accordance with an example of the proposed technology illustrated schematically in FIG. 1.

FIG. 2 illustrates example methods associated with automatic distribution of a third-party license for a third-party service operating in association with a licensed first-party service, in accordance an example of the proposed technology.

At 202, a customer may purchase a first-party license from a first-party vendor. For example, with reference to FIG. 1, the customer associated with the customer ID 104 may purchase the first-party license 126 having the expiry date 130, the count 132, the type 134 and the name 136.

At 204, the first-party vendor may issue the purchased first-party license to the customer and may store the customer ID in association with the first-party license in a database of the first-party license infrastructure. For example, the customer ID 104 may be stored in association with the first-party license 126 in the database 124 of the first-party license infrastructure 122.

Although not explicitly illustrated in FIG. 2, the first-party vendor may be aware that the first-party service for which the first-party license has been issued is associated with a third-party service, provided by a third-party vendor, for which a third-party license is required. In accordance with the proposed technology, at 206, the first-party vendor may proceed to request that the third-party vendor issue to the customer a third-party license that aligns with the first-party license issued at 204. With reference to FIG. 1, the third-party vendor may provide an API through which the first-party license infrastructure 122 is able to send a request to the third-party license infrastructure 142. As previously described, the request may comprise indications of the expiry date 130, the count 132, the type 134 and the name 136 of the first-party license 126, as well as the customer ID 104 with which the requested third-party license is to be associated.

At 208, the third-party vendor may issue a third-party license having the terms aligning with those indicated in the request. For example, the third-party license infrastructure 142 may issue the third-party license 146 having the expiry date 130, the count 132, the type 154 and the name 156. The customer ID 104 may be stored in association with the third-party license 146 in the database 144 of the third-party license infrastructure 142.

One of the attributes of the third-party license issued at 208 is a third-party license key. Upon issuance of the third-party license, the third-party vendor may return the third-party license key to the first-party vendor, as shown at 210. For example, with reference to FIG. 1, the third-party license infrastructure 142 may respond to the request that was sent at 206 by returning the third-party license key 148 that points to the third-party license 146.

Upon receipt of the third-party license key, the first-party vendor may store the third-party license key as an attribute of the first-party license, as shown at 212. For example, as illustrated in FIG. 1, the first-party license infrastructure 122 may embed the third-party license key 148 in the first-party license 126 that is stored in the database 124. In this manner, a third-party license key may be made available to a customer as part of a first-party license, thereby enabling access to a first-party service that is associated with a licensed third-party service, without requiring any explicit action by the customer with respect to the third-party license. That is, as long as a customer device has been allocated use of a first-party license, the customer device will automatically be allocated use of a corresponding third-party license. The terms of third-party license align with the terms of the first-party license, thereby avoiding the possibility of synchronization problems.

Figure 3:
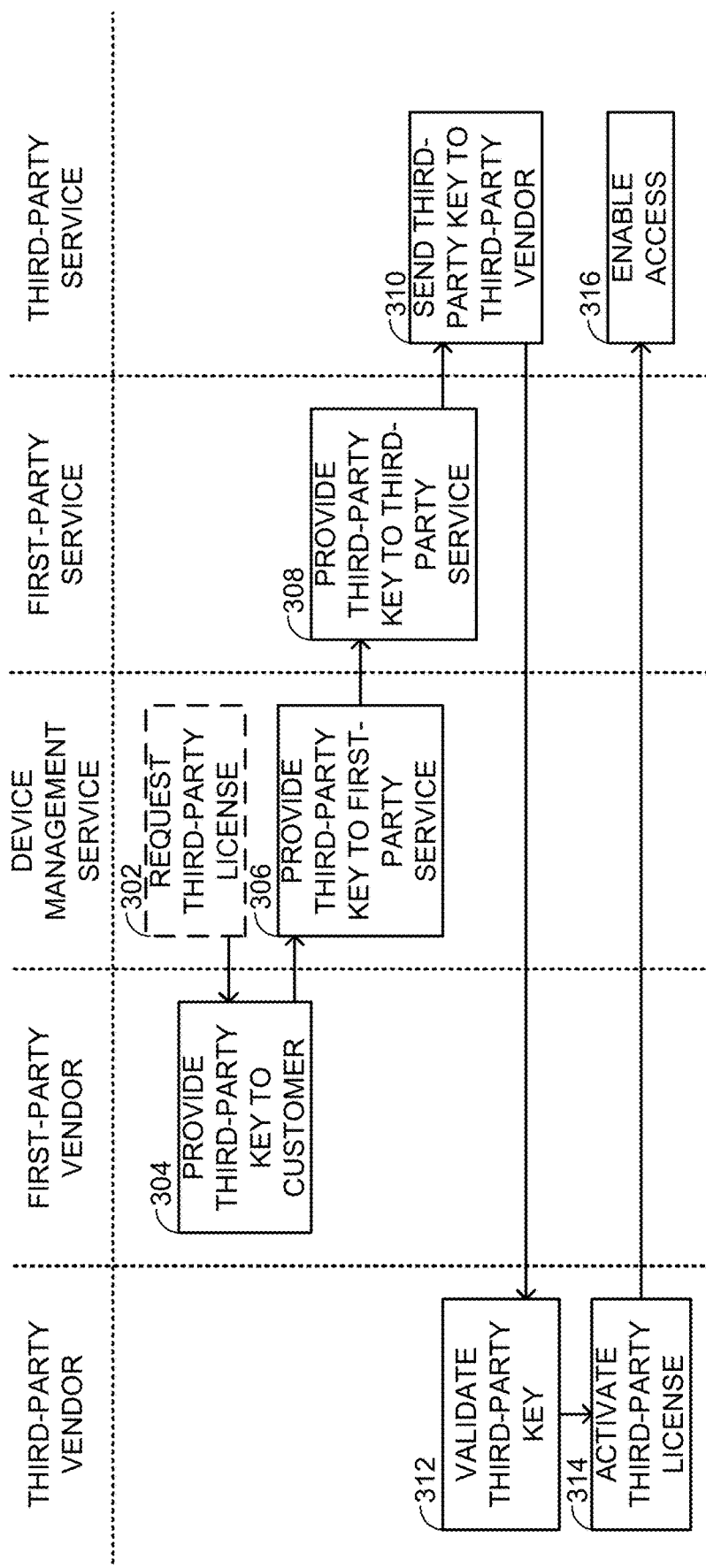

FIG. 3 illustrates example methods associated with automatic distribution of a third-party license for a third-party service operating in association with a licensed first-party service, in accordance an example of the proposed technology.

At some point, the first-party vendor may provide the third-party license key to the entity to which the third-party license has been issued. This is shown at 304. For example, with reference to FIG. 1, the first-party license infrastructure 122 may send the third-party license key 148 to the device management service 112. In one example, the third-party license key is provided in response to a request, as shown at 302. For example, the device management service 112 may receive a request from the first-party service 106, and may determine that a third-party license is required for the third-party service 108 in order to enable access to the first-party service 106. The device management service 112 may then send a request to the first-party license infrastructure 122 for a third-party license key. Alternatively, the first-party service 106 on a particular customer device may send a direct request to the first-party license infrastructure 122 for a third-party license key, without the involvement of a device management service. In another example, the device management service 112 may periodically synchronize to the database 114 information about the first-party licenses from the database 124 of the first-party license infrastructure 122, including the first-party license 126 and the third-party license key 148 embedded therein.

At a particular customer device for which a third-party license has been requested, the third-party license key, having been extracted from the first-party license, may be provided to the first-party service at 306. The first-party service may subsequently provide the third-party license key to the third-party service at 308. For example, the device management service 112 may provide the third-party license key 148 to the first-party service 106 on the customer device 100, and the first-party service 106 may then provide the third-party license key 148 to the third-party service 108.

Upon receipt of the third-party license key at 308, the third-party service may proceed to send a service request to the third-party vendor, where the service request includes the third-party license key 308, the device ID 102, and optionally the customer ID 104.

This is shown at 310. For example, the third-party service 108 may send the third-party license key 148 to the third-party license infrastructure 142.

Upon receipt of the third-party license key, the third-party vendor may validate the key, as shown at 312. For example, the third-party license infrastructure 142 may compare the third-party license key received from the third-party service 108 at the customer device 100 (having the customer ID 104) to the third-party license key 148 of the third-party license 146 that is associated with the customer ID 104 in the database 144. In the event that the received third-party license key is validated, the third-party vendor may activate the third-party license for use by the requesting customer device, as shown at 314, and may enable the customer device to access the third-party service, as shown at 316. For example, upon validation of the third-party license key 148, the third-party license infrastructure 142 may store the device ID 102 in association with the third-party license 146 in the database 144. The third-party license infrastructure 142 may also send a message to the customer device 100, where the message causes the third-party service 108 to become accessible at the customer device 100.

It should be noted that the actual person using the customer device 100 may not be directly involved in the process of requesting, obtaining and using the third-party license key. The user of the customer device 100 may only be aware of which first-party license has been purchased. Everything about the third-party license (such as when and why it is required, and how it is obtained and used) may be concealed from the user of the customer device 100. It should also be noted that there may or may not be an intermediary device management service involved in the provisioning of the first-party service.

Figure 4:
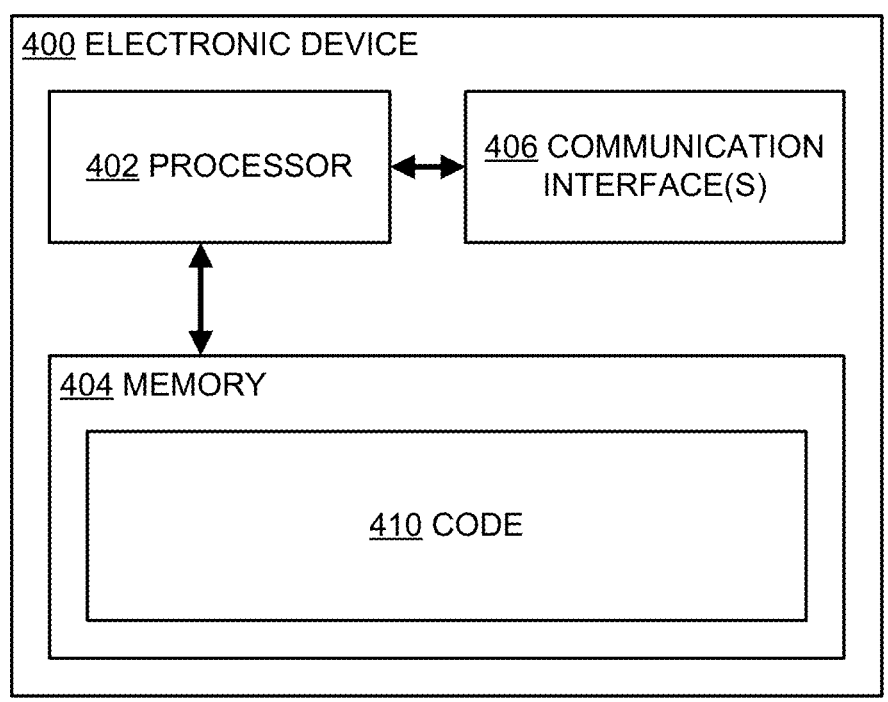
FIG. 4 illustrates a block diagram of an example electronic device in accordance with examples of the proposed technology.

FIG. 4 is a block diagram of an example electronic device 400. The device 400 may contain other elements which, for clarity, are not shown in FIG. 4.

The device 400 may represent an example of the customer device 100. Alternatively, the device 400 may represent an example of the one or more electronic devices that are involved in the methods performed by any one of the device management service 112, the first-party license infrastructure 122 and the third-party license infrastructure 142.

The device 400 comprises a processor 402 which is coupled to a memory 404 and to one or more communication interfaces 406 through which it is operable to communicate with one or more other electronic devices.

The communication interfaces 406 may comprise one or more wired communication interfaces, wireless communication interfaces or both. For example, the one or more communication interfaces 406 may comprise any of a Universal Serial Bus (USB) interface, an Ethernet interface, an Integrated Services Digital Network (ISDN) interface, a Digital Subscriber Line (DSL) interface, a Local Area Network (LAN) interface, a High-Definition Multimedia (HDMI) interface, a Digital Visual Interface (DVI), or an Institute of Electrical and Electronics Engineers (IEEE) 1394 interface such as an i.LINK™, Lynx℠ or Firewire® interface. Alternatively, or additionally, the one or more communication interfaces 406 may comprise any of a Wireless Local Area Network (WLAN) interface, a short-range wireless communication interface such as a Wireless Personal Area Network (WPAN) interface, a Wireless Wide Area Network (WWAN) interface, or a Wireless Metropolitan Area Network (WMAN) interface. The communication interfaces 406 are adapted to enable the communications between the device 100, the device management service 112, the first-party license infrastructure 122 and the third-party license infrastructure 142, as illustrated at 118, 120, 138 and 150 in FIG. 1.

The memory 404 may be operable to store computer-executable code 410 that, when executed by the processor 402, results in one or more of the methods described herein.

The memory 404 may store additional information, depending on whether the device 400 is an example of a customer device, or a device involved in performing the functions of a device management service, or a device involved in performing the methods of a license infrastructure.

For example, where the device 400 is an example of the customer device 100, the memory 404 may comprise the first-party service 106 and the associated third-party service 108, and the code 410 may comprise instructions that result in the methods performed by the first-party service 106 and the third-party service 108 as described with reference to any one of FIGS. 1 to 3.

In another example, where the device 400 is involved in the actions performed by the device management service 112, the memory 404 may comprise the database 114, and the code 410 may comprise instructions that result in the methods performed by the device management service 112 as described with reference to any one of FIGS. 1 to 3.

In another example, where the device 400 is involved in the actions performed by the first-party license infrastructure 122 (or the third-party license infrastructure 142), the memory 404 may comprise the database 124 (or the database 144), and the code 410 may comprise instructions that result in the methods performed by the first-party license infrastructure 122 (or the third-party license infrastructure 142) as described with reference to any one of FIGS. 1 to 3.

What is claimed is:

1. A method for accessing a first-party service of a first-party vendor and a third-party service of a third-party vendor, the method comprising:
   at a first party vendor server:
   receiving a request from an electronic device for access to the first-party service;
   storing, in association with a customer identifier of the electronic device, a first-party license for the first-party service, the first-party license having first-party license attributes comprising a count and an expiry date;
   sending to a third-party vendor server, via an application programming interface provided by the third-party vendor, a request for a third-party license for the third-party service, the request comprising the count, the expiry date and the customer identifier;
   receiving from the third-party vendor server a third-party license key pointing to the third-party license having third-party license attributes comprising the count and the expiry date as indicated in the request;
   storing the third-party license key as an attribute of the first-party license; and
   at the electronic device:
   accessing the first party service and the third-party service using the first-party license.

2. The method of claim 1, further comprising:
   providing the third-party license key to the electronic device.

3. The method of claim 1, wherein the request further comprises a name and wherein the third-party license attributes further comprise the name as indicated in the request.

4. The method of claim 3, wherein the first-party license attributes further comprise a first-party license name, and wherein the name comprised in the request is identical to the first-party license name.

5. The method of claim 3, wherein the first-party license attributes further comprise a first-party license name, the method further comprising:
   at the first party vendor
   storing a mapping of the first-party license names and third-party license names; and
   determining the name from the mapping and the first-party license name.

6. The method of claim 1, wherein the request further comprises a type and wherein the third-party license attributes further comprise the type as indicated in the request.

7. The method of claim 6, wherein the first-party license attributes further comprise a first-party license type, and wherein the type comprised in the request is identical to the first-party license type.

8. The method of claim 6, wherein the first-party license attributes further comprise a first-party license type, the method further comprising:
   at the first party vendor
   storing a mapping of the first-party license types and e third-party license types; and
   determining the type from the mapping and the first-party license type.

9. A system for accessing a first-party service of a first-party vendor and a third-party service of a third-party vendor, the system comprising:
   a first party vendor server comprising:
   a memory storing, in association with a customer identifier of an electronic device, a first-party license for the first party service, the first-party license having first-party license attributes comprising a count and an expiry date; and
   a first processor configured
   to receive a request from the electronic device for access to the first-party service;
   to send to the third-party vendor server, via an application programming interface provided by the third-party vendor, a request for a third-party license for the third-party service, the request comprising the count, the expiry date, and the customer identifier;
   to receive from the third-party vendor a third-party license key pointing to the third-party license having third-party license attributes comprising the count and the expiry date as indicated in the request; and
   to store the third-party license key as an attribute of the first-party license; and
   the electronic device comprising a second processor configured
   to access the first-party service and the third-party service using the first party license.

10. The system of claim 9, wherein the first processor is configured to provide the third-party license key to the electronic device.

11. The system of claim 9, wherein the request further comprises a name and wherein the third-party license attributes further comprise the name as indicated in the request.

12. The system of claim 11, wherein the first-party license attributes further comprise a first-party license name, and wherein the name comprised in the request is identical to the first-party license name.

13. The system of claim 11, wherein the first-party license attributes further comprise a first-party license name, and wherein the first processor, is further configured:
   to store a mapping of the first-party license names and third-party license names; and
   to determine the name from the mapping and the first party license name.

14. The system of claim 9, wherein the request further comprises a type and wherein the third-party license attributes further comprise the type as indicated in the request.

15. The system of claim 14, wherein the first-party license attributes further comprise a first-party license type, and wherein the type comprised in the request is identical to the first-party license type.

16. The system of claim 14, wherein the first-party license attributes further comprise a first-party license type, and wherein first processor is further configured:
   to store a mapping of the first-party license types and third-party license types; and
   to determine the type from the mapping and the first party license type.

\* \* \* \* \*